United States Patent [19]

Inagaki et al.

[11] Patent Number: 5,067,151
[45] Date of Patent: Nov. 19, 1991

[54] TELEPHONE HANDSET WITH ELECTROSTATIC DISCHARGE PREVENTION

[75] Inventors: Masaru Inagaki, Tokyo; Toshio Matsushita, Shizuoka, both of Japan

[73] Assignee: NEC Corporation, Japan

[21] Appl. No.: 374,084

[22] Filed: Jun. 29, 1989

[30] Foreign Application Priority Data

Jun. 30, 1988 [JP] Japan .................... 63-87743[U]

[51] Int. Cl.⁵ ............................................. H04M 1/00
[52] U.S. Cl. .................................. 379/433; 379/438; 379/428
[58] Field of Search ............... 379/433, 428, 437, 438, 379/440, 370; 439/676

[56] References Cited

U.S. PATENT DOCUMENTS

| | | | |
|---|---|---|---|
| 3,444,329 | 5/1969 | Krumreich | 379/438 |
| 3,643,205 | 2/1972 | Elkins | 379/438 |
| 4,124,785 | 11/1978 | Seretny et al. | 379/370 |
| 4,284,855 | 8/1981 | Adams et al. | 379/440 |
| 4,291,202 | 9/1981 | Adams et al. | 379/370 |
| 4,319,095 | 3/1982 | Cogan | 379/433 |
| 4,675,903 | 6/1987 | Gulezian et al. | 379/433 |
| 4,712,236 | 12/1987 | Brown et al. | 379/433 |
| 4,803,724 | 2/1989 | Utoh et al. | 379/433 |

FOREIGN PATENT DOCUMENTS

1175749 8/1964 Fed. Rep. of Germany ...... 379/433

Primary Examiner—Jin F. Ng
Assistant Examiner—Jason Chan
Attorney, Agent, or Firm—Laff, Whitesel, Conte & Saret

[57] ABSTRACT

A telephone set includes a base and a handset which are interconnected by a cord terminated in a modular plug and jack, at least on the handset end of the cord. The plug is recessed far enough in the handset to preclude an electrostatic coupling between a human hand holding the handset and the plug and jack. Also, the recessing is far enough to keep the plug from becoming dislodged from the jack by an accidental movement of a locking leaf spring or plug associated with said plug.

4 Claims, 7 Drawing Sheets

TELEPHONE HANDSET WITH ELECTROSTATIC DISCHARGE PREVENTION

BACKGROUND OF THE INVENTION

1. Field of the Invention

The present invention relates to a telephone handset and, more particularly, to a telephone handset having a modular jack which is provided with an implementation for preventing electrostatic discharge.

2. Description of the Prior Art

Figure 1:
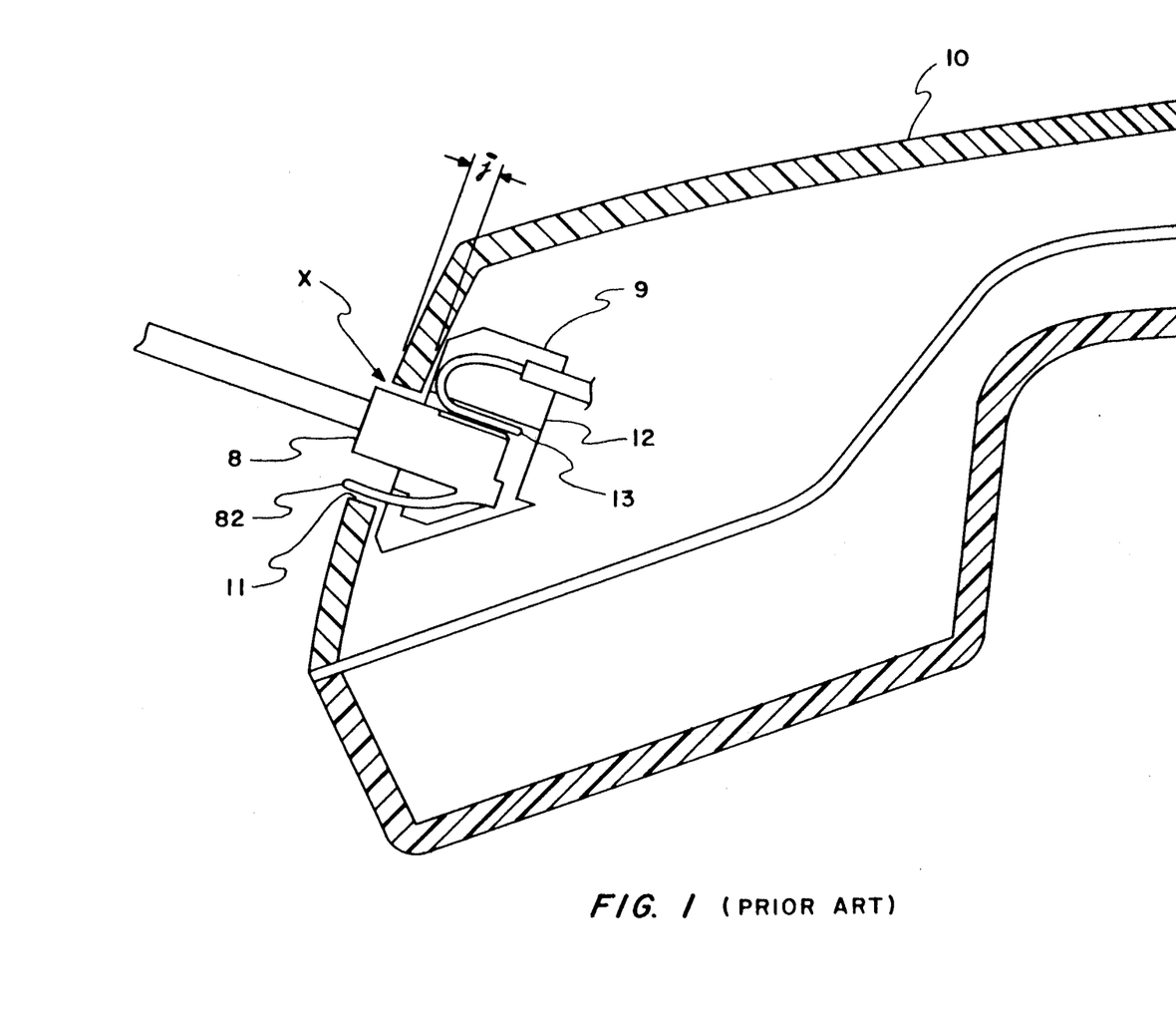
FIG. 1 is a section view of a prior art telephone handset having a modular jack thereinside.

A current trend in the telephones art is toward a telephone body and a handset which are interconnected by a coiled cord having modular plugs at opposite ends thereof. Specifically, as shown in FIG. 1, the handset of this type of telephone has a modulator jack 9 for accommodating a modular plug 8 which is fitted on one end of a coiled cord. To promote easy insertion and removal of the modular plug 8, the modular jack 9 has customarily been located in close proximity to a plug inlet 11 which is formed through a handset cover 10.

A modular jack having a specific construction is disclosed in U.S. Pat. No. 3,850,497, while a handset (telephone set) using such a modular jack is disclosed in U.S. Pat. No. 4,124,785. The modular jack 9 shown in FIG. 1 has an insulative case 12 in which conductors 13 are accommodated in a bent position to provide electrical contacts.

The bend of each conductor 13 is so positioned as to face outwardly without exception in order to facilitate the insertion of the modular plug 8. More specifically, the bend is extremely close to the outer periphery of the handset because the modular jack 9 is situated immediately inwardly of the opening 11. This brings about a serious problem inasmuch as the handset is to be held by hand. When one holds the handset, especially when one holds its portion adjacent to the opening 11 as we so often do, the static electricity from the human body is discharged to the contacts of the jack 9 and those of the plug 8. This introduces noise into the telephone circuit and often results in malfunctions. Further, the sweat and moisture on the palm of the hand is apt to short-circuit the contacts of the plug 8 and jack 9.

The plug 8 and jack 9 are fixed together by a locking mechanism in order to insure their continued electrical connection. For this purpose, the plug 8 has an elastic tongue or resilient leaf spring 82 which protrudes from the handset through the opening 11, as shown in FIG. 1. This gives rise to another problem that while one is talking on the telephone, the leaf spring or tongue 82 is apt to catch the person's finger resulting in the plug 8 being pulled out of the jack 9.

SUMMARY OF THE INVENTION

It is therefore an object of the present invention to provide a telephone handset which minimizes the chance of discharge of static electricity from the human body to a modular jack and a modular plug.

It is another object of the present invention to provide a telephone handset which prevents a modular plug from being inadvertently pulled out of a modular jack while the handset is held by hand.

It is a further object of the present invention to provide a telephone handset which allows a modular jack to be readily built therein and surely fixes it in place.

In accordance with the present invention, a telephone handset has electrostatic discharge prevention capabilities. A telephone body is connected by a cord, on which a modular plug is fitted, to a handset having a modular jack for receiving the modular plug. The modular jack is disposed in the handset at least a distance of l away from a hand holding it. The distance l is measured from an opening which is formed through the handset for the insertion of the plug. The distance l prevents an elastic locking tongue of the plug from protruding from the handset to the outside. A wall is molded integrally with the handset and positioned outwardly of electrical contacts of the modular jack for concealing the electrical contacts from the opening.

BRIEF DESCRIPTION OF THE DRAWINGS

The above objects, features and advantages of the present invention will become more apparent from the following detailed description taken with the accompanying drawings in which.

In the drawings, similar components or structural elements are designated by the same reference numerals.

DESCRIPTION OF THE PREFERRED EMBODIMENT

Figure 2:
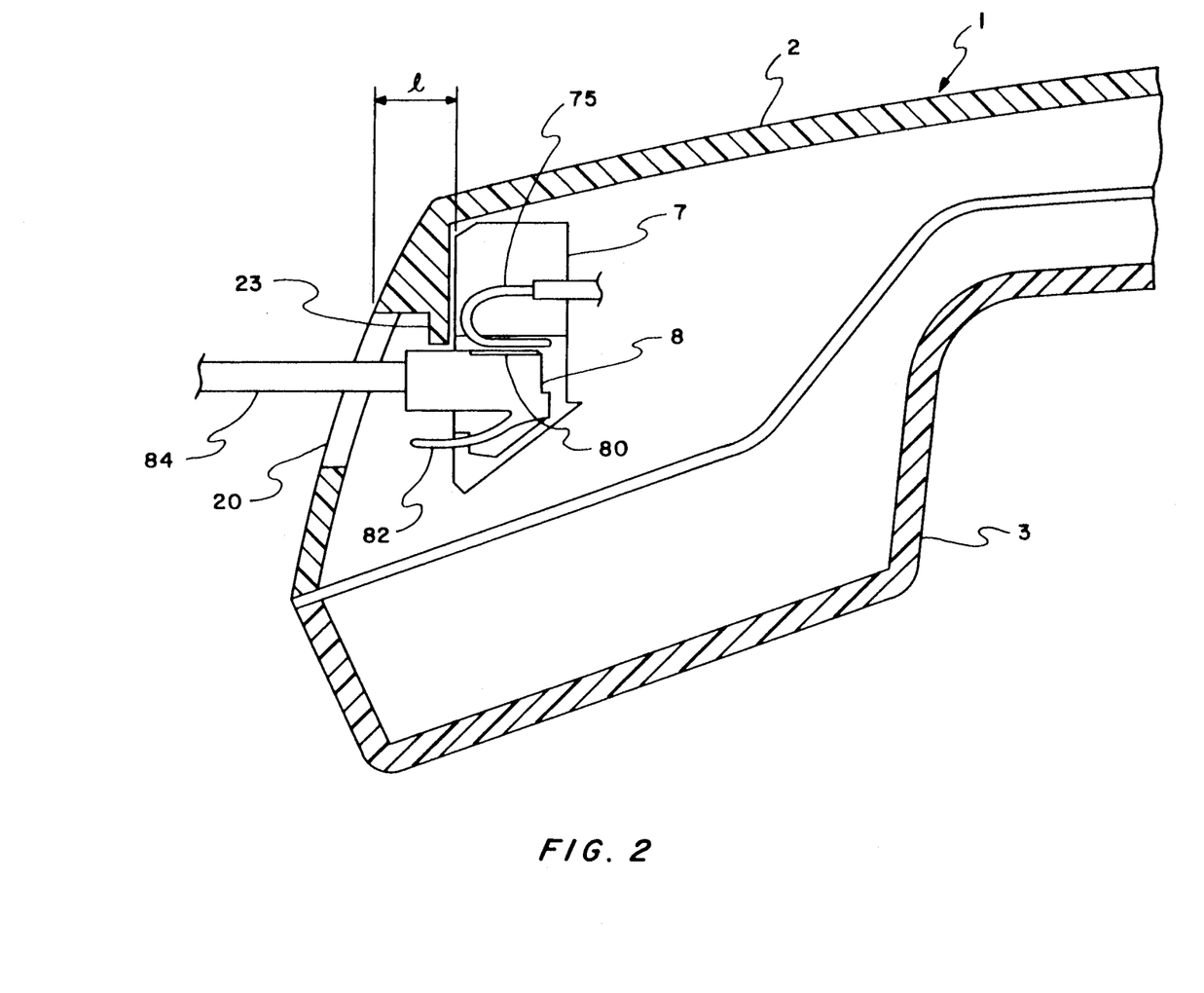
FIG. 2 is a section view of one embodiment of the present invention.
Figure 3A:
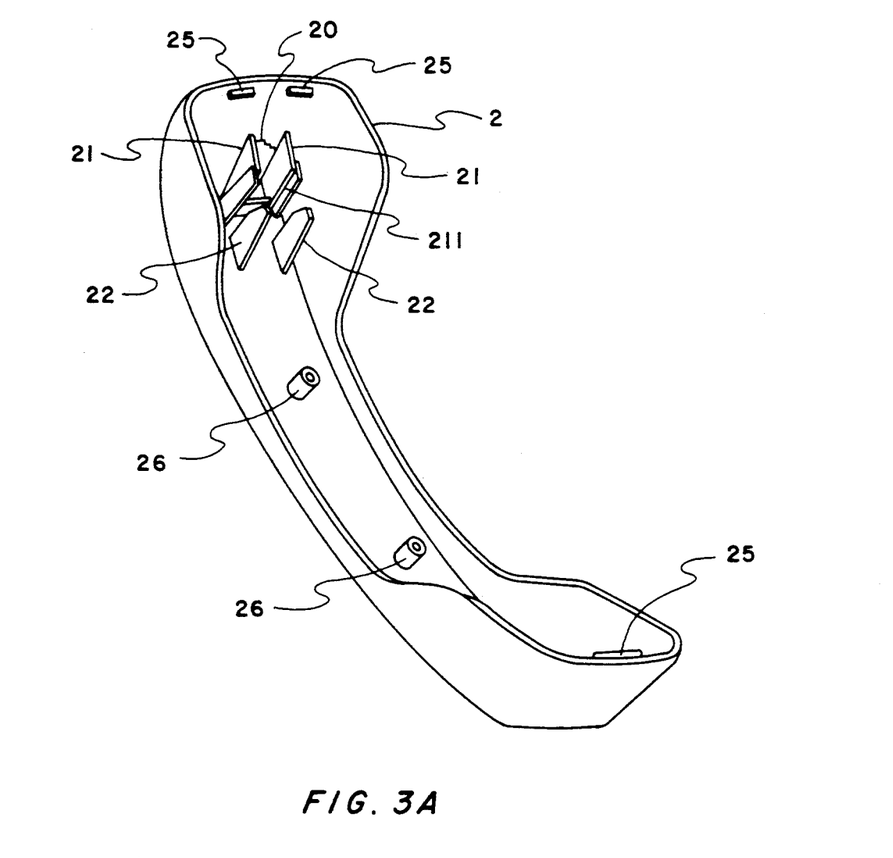
FIG. 3A is a perspective view showing the interior of a handset cover which forms a part of the embodiment of FIG. 2.
Figure 3B:
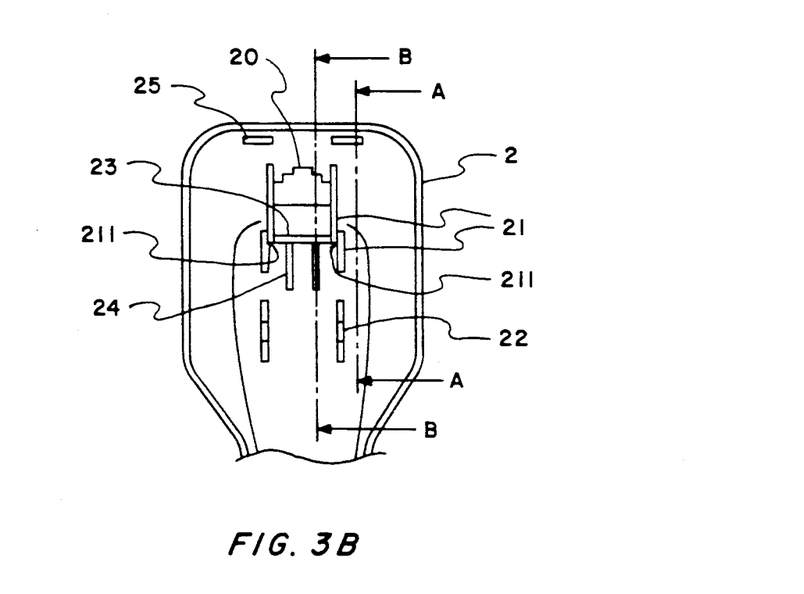
FIG. 3B is a fragmentary plan view showing the internal configuration around a plug inlet opening of the handset cover shown in FIG. 3A.
Figure 3C:
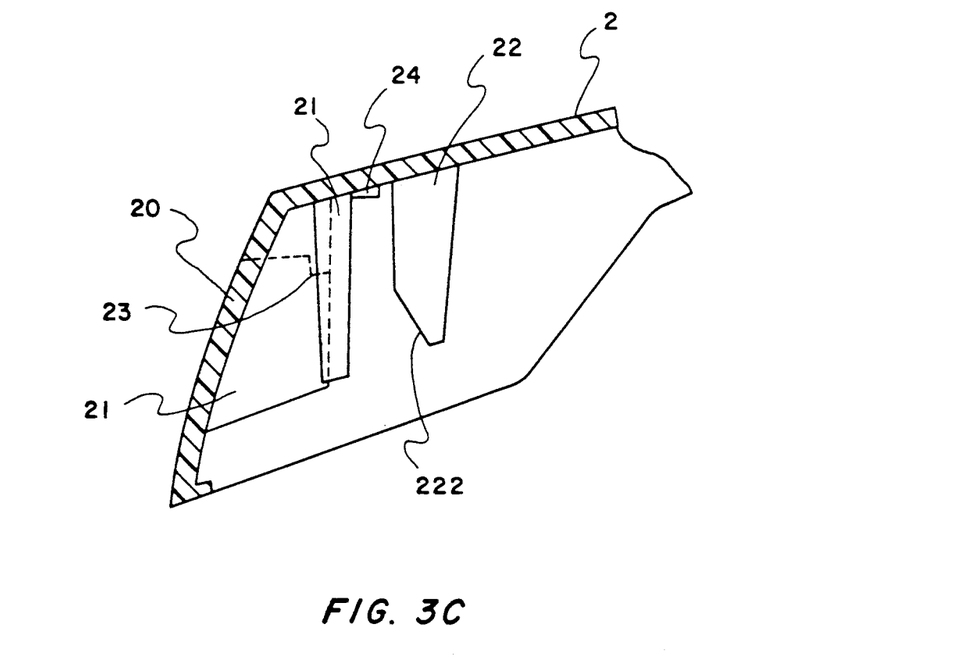
FIGS. 3C and 3D are respectively sections along lines A—A and B—B of FIG. 3B.
Figure 3D:
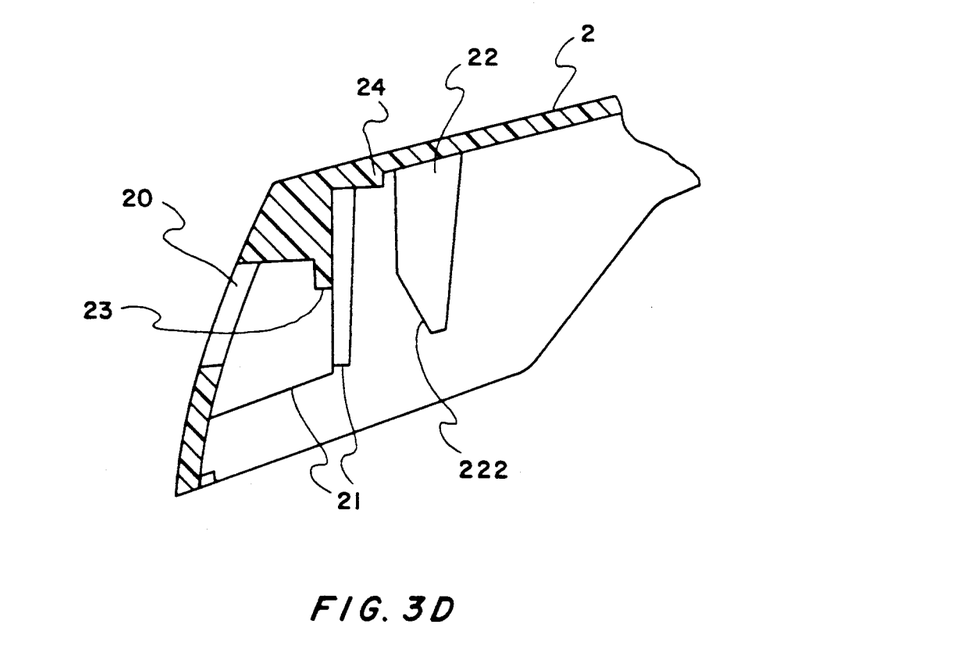

Referring to FIG. 2, a telephone handset 1 embodying the present invention has a handset cover 2, a handset case 3, and a modular jack 7. The modular jack 7 is fixed in place when the cover 2 and case 3 are put together, as described in detail later.

The cover 2 has an opening 20 for the insertion of a modular plug 8. The modular jack 7 is situated in the handset 1 at a distance of l from the opening 20 as measured in the intended direction of insertion of the plug 8. The plug 8 has electrical contacts 80, while the jack 7 has resilient conductors (electrical contacts) 75 which make contact with the contacts 80. The cover 2 has an extension or wall 23 which is positioned outwardly of the jack 7 to conceal the conductors 75 from the opening 20. Molded integrally with the cover 2, the wall 23 is so dimensioned as not to interfere with the plug 8 when the latter is inserted into the opening 20. An elastic tongue or resilient leaf spring 82 extends from the plug 8 to lock the plug 8 to the jack 7 when they are connected together. This prevents the plug 8 from being pulled out of the jack 7 even when a cord 84 on which the plug 8 is fitted is pulled outward.

When the plug 8 is inserted in the jack 7, it urges the conductors 75 upward as viewed in FIG. 2 while the wall 23 of the cover 2 prevents the conductors 75 from showing themselves through the opening 20. In this condition, not only the spatial distance between the conductors 75 and the opening 20 is increased, but also the distance along the surfaces is increased by the wall 23. This geometrical arrangement is successful in eliminating the discharge ascribable to an electrostatic voltage which is induced in the human body when the telephone is used in a usual condition.

Further, since the jack 7 is disposed in the handset 1 at the distance 1 as measured from the opening 20, the elastic tongue or resilient leaf spring 82 of the plug 8 does not protrude from the handset 1 through the opening 20. Hence, the tongue or leaf spring 82 is fully isolated from fingers while the handset 1 is held by hand.

The configuration of the handset 1 for accommodating the modular jack 7, as stated above, will be described in detail.

Referring to FIGS. 3A to 3D, the handset cover 2 is a molding of insulative resin. Cover 2 has intrigally molded therein opening 20, a pair of first guides 21 extending from the inner surface of the cover 2 at opposite sides of the opening 20, a pair of second guides 22 spaced apart from the first guides 21, the wall 23, a stop 24 for abutting against the upper end of the modular jack 7, lugs 25 for fixing the cover 2 to the handset case 3, and lugs 26. Each lug 26 has a threaded hole for fixing the cover 2 to the case 3. The first guides 21 have shoulders 211 at their facing, or inner surfaces, in order to hold and guide the jack 7. The second guides 22 extend, parallel to each other, from the inner surface of the cover 2. Each guide 22 has a tapered tip 222.

Figure 4:
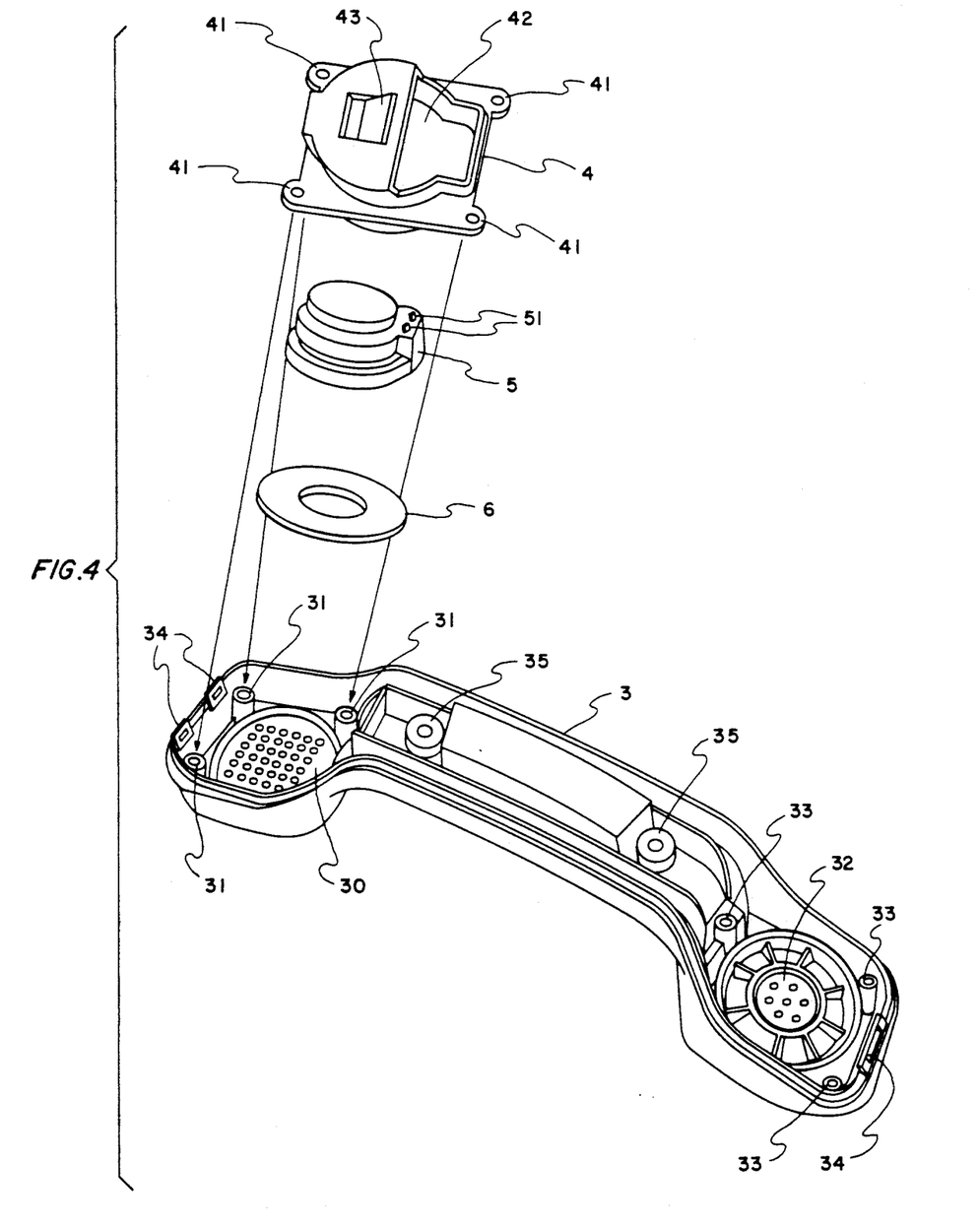
FIG. 4 is a perspective view of another part of the embodiment.

FIG. 4 indicates the configuration of the handset case 3 in detail. Also implemented by a molding of insulative resin, the case 3 has a transmitter unit accommodating portion 30. Four lugs 31 (one is not visible) are located around the portion 30, each having a threaded hole for fixing a transmitter unit. A receiver unit accommodating portion 32 has three lugs 33 located around the portion 32, each having a threaded hole for fixing a receiver unit. Recesses 34 individually engage the lugs 25 of the cover 2 for provisionally fixing the cover 2 to the case 3. Two through holes 35 provide for firmly fixing and joining the case 3 and cover 2. Specifically, screws are driven into the threaded holes 26 of the cover 2 and through the holes 35 of the case 3 to thereby firmly interconnect the case 3 and cover 2.

As shown in FIG. 4, a transmitter unit 5 is disposed in the transmitter unit accommodating portion 30 with the intermediary of an elastic member 6 made of rubber, for example. A fixing member 4 made of insulative resin is fastened to the case 3, from above the transmitter unit 5, by using the lugs 31 and through holes 41 which are formed in the fixing member 4. The fixing member 4 has an opening 42 for allowing connecting terminals 51 of the transmit unit 5 to be accessible. A tapered portion 43 securely holds the modular jack 7, as will be described. An elastic member, a receiver unit and a receiver unit fixing member (not shown) are positioned in the receiver unit accommodating portion 32, although not shown in the figure. These members and unit associated with the receiver unit accommodating portion 32 may be constructed and arranged in the same manner as conventional ones, and thus a redundant description thereof will be avoided for simplicity.

Figure 5A:
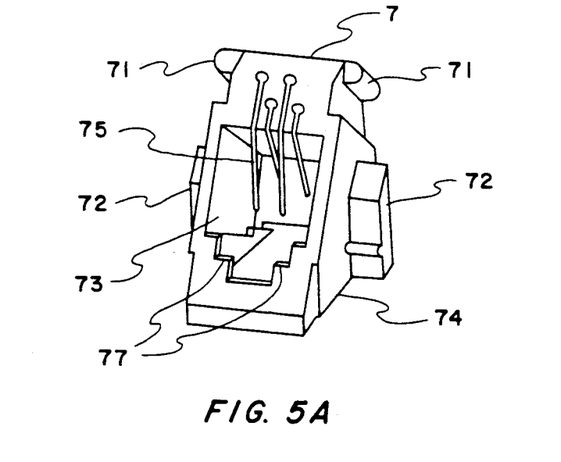
FIGS. 5A and 5B are respectively a perspective view and a side elevation of a modular jack.
Figure 5B:
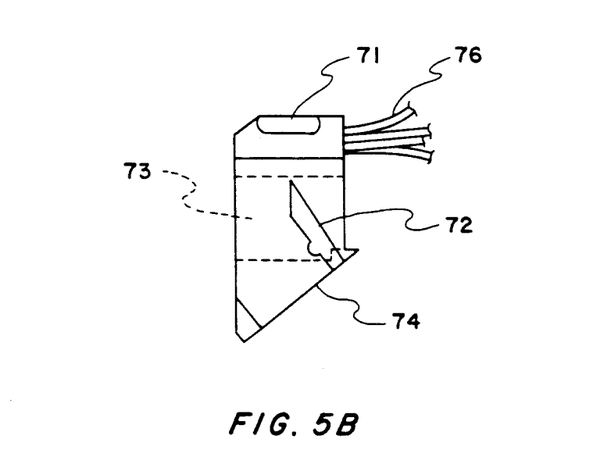
Figure 5C:
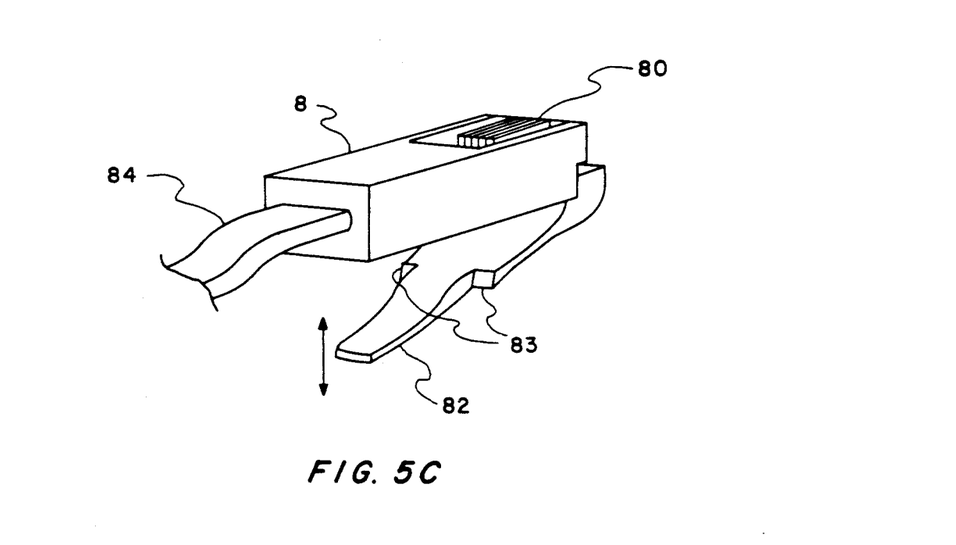
FIG. 5C is a perspective view of a modular plug.

Referring to FIGS. 5A and 5B, the modular jack 7 has a generally prismatic configuration. Guide lugs 71 protrude sideways, and away from each other, from upper opposite sides of the jack 7. Flanges 72 project sideways away from each other from intermediate opposite sides of the jack 7. A bore 73 is formed in the front end of the jack 7, while resilient conductors 75 individually extend out from four cords 76 and protrude through the bore 73 while being bent as illustrated. When the modular plug 8 (FIG. 5C) is inserted in the bore 73, the resilient conductors 75 make contact with contacts 80 of the plug 8 to establish electrical connections between the jack 7 and plug 8. At this instant, an elastic tongue or resilient leaf spring 82 (FIG. 5C) extending from the plug 8 has shoulders 83 thereof caught by locking portions 77 (FIG. 5A) of the jack 7, whereby the plug 8 is securely retained by the jack 7. The jack 7 has a tapered bottom 74.

Figure 6:
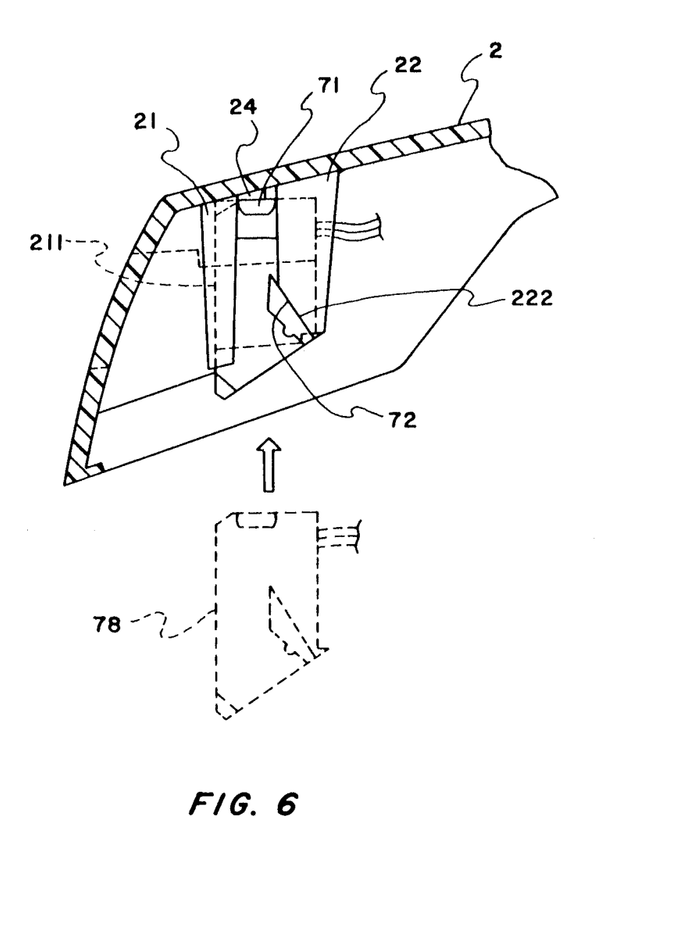
FIG. 6 is a section showing the modular jack being retained by the handset cover.

How the modular jack 7 is fixed in place at the distance of 1 from the outer periphery of the handset will be described with reference to FIGS. 6 and 7.

Two of the four cords 76 (FIG. 5B) fitted on the modular jack 7 are connected to the terminals 51 (FIG. 4) of the transmitter unit 5, while the other two cords 76 are connected to the receiver unit (not shown). In this condition, the jack 7 is mounted on the handset cover 2, as shown in FIG. 6. Specifically, when the guide lugs 71 of the jack 7 are individually inserted between the first and second guides 21 and 22 of the over 2, the edge of the front end 78 of the jack 7 is press-fitted along the shoulders 211 of the first guides 21. As the upper end of the jack 7 abuts against the stop 24 of the cover 2, the tapered portions of the flanges 72 of the jack 7 are brought into engagement with the tapered portions 222 of the second guides 22 of the cover 2. Consequently, the jack 7 is accurately positioned in the horizontal direction. The distance 1 (FIG. 7) as measured in the depth wise direction of the cover 2 is defined by the shoulders 211. In this condition, the upper edge of the bore 73 (FIG. 5B) of the jack 7 is substantially flush with the lower edge of the wall 23 (FIG. 3D) which is situated between the first guides 21. More specifically, the bent portions of the conductors 75 fitted on the jack 7 are located at the distance 1 as measured from the opening 20 (FIG. 2) and are concealed from the outside by the wall 23.

Subsequently, the cover 2 is locked to the case 3 by using the lugs 25 (FIG. 3A) and recesses 34 (FIG. 4) and then fastened to the latter by driving screws into the lugs 26 via the through holes 35. As a result, the tapered bottom 74 (FIG. 7) of the jack 7 contacts the tapered portion 43 of the upper end of the fixing member 4 which has been fastened to the transmitter unit accommodating portion 30. This positions the jack 7 in the vertical direction and thereby prevents it from slipping out of the first and second guides 21 and 22. In such a handset assembly, the jack 7 is inhibited from shaking because it is firmly retained in both of the right-and-left and up-and-down directions. Furthermore, the jack 7 is automatically fixed in place when the handset is assembled, without resorting to screws.

In the handset 1 completed by the above procedure, a space is defined between the two first guides 21 and the top of the fixing member 4 and at the front of the jack 7. This space is wide enough to accommodate the elastic tongue or leaf spring 82 of the plug 8 and prevents it from protruding to the outside of the handset.

Experiments were conducted to compare the characteristics of the prior art structure shown in FIG. 1 and those of the illustrative embodiment. Specifically, static discharge tests were conducted by placing the two different handsets on a conductive plate which was connected to ground, connecting a first terminal of static discharge tester to the conductive plate, and causing a second terminal of the tester into contact with an edge portion X of the plug inlet opening of each handset.

According to the EIA (Electric Industries Association) standards, when the discharge resistance R is 10 kiloohms and the charge capacitance C between the first and second terminals of the tester is 60 picofarads, the discharge test is carried out at the potential V of 20 kilovolts; when R is 500 ohms and C is 100 picofarads, the test is carried out at said V of 10 kilovolts.

Figure 7:
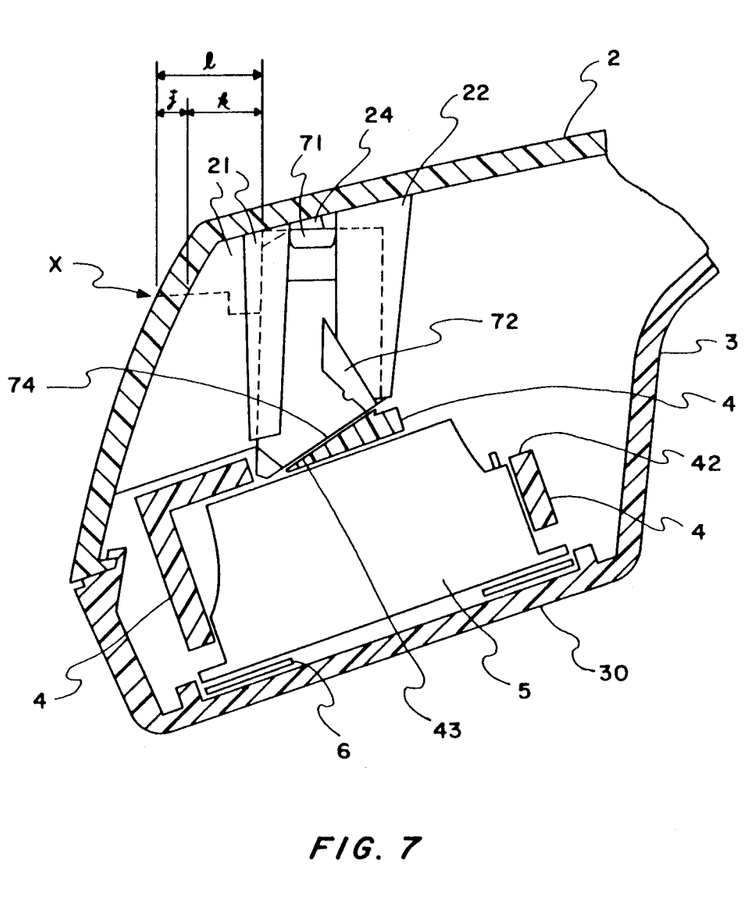
FIG. 7 is a section showing the embodiment in an assembled state.

The handset of FIG. 1 has a distance j which is about 4 millimeters, while the handset of FIG. 7 has a distance l which is about 10 millimeters and set up by shifting the jack inward by k=6 millimeters. When R was 10 kiloohms and C was 60 picofarads, the firing potential $V_o$ was measured to be 15 kilovolts with the prior art handset and 23 kilovolts with the handset of the present invention; when R was 500 ohms and C was 100 picofarads, $V_o$ of 8 kilovolts was observed with the prior art handset while $V_o$ of 15 kilovolts was observed with the handset of the present invention. This proves that the handset of the present invention achieves a far higher firing potential than the prior art handset.

What is claimed is:

1. A telephone handset comprising a modular plug fitting on an end of a telephone cord, an electrostatic discharge prevention means connectable to a telephone body by said cord on, said modular plug having a resilient leaf spring locking tongue for locking it in place, said handset comprising:

a modular jack having electrical contacts for receiving the modular plug, said handset having an opening through which said plug may be inserted, said jack being disposed in said handset in a position which is at least a distance of l as measured from said opening which is formed through said handset for the insertion of said plug, said distance being great enough to prevent the locking tongue of the plug from protruding from said handset to the outside thereof;

a wall molded integrally within said handset and positioned outwardly of said electrical contacts of said modular jack for concealing said electrical contacts from the opening in said hand set;

a handset cover and a handset case;

said handset cover having an interior comprising a pair of parallel first guide members positioned at opposite sides adjacent to an inner surface of said handset cover where the opening is located, and a pair of parallel second guide members which are spaced apart from said first guide members by a predetermined distance, said first and second guide members being molded integrally with said handset cover;

said wall being positioned between said first guide members; and said modular jack being retained between said first and said second guide members.

2. A telephone handset as claimed in claim 1, wherein said first guide members are provided with shoulders having a substantial length on confronting inner surfaces in order to define the distance l.

3. A telephone handset as claimed in claim 2, wherein said modular jack comprises a pair of guide lugs extending sideways and away from each other on an upper portion of said modular jack, and a pair of flanges extending sideways and away from each other on an intermediate portion of said modular jack;

when said modular jack is retained by said handset cover, said guide lugs of said modular jack being individually inserted between gaps which are defined between said first guide members and said second guide members, and said flanges individually abutting against tapered tip portions of said second guide members, whereby said modular jack is positioned in a horizontal direction.

4. A telephone handset as claimed in claim 3, wherein said handset case comprises a fixing member for fixing a transmitter unit, said fixing member having a tapered surface on an upper surface thereof which is complementary in configuration to a bottom of said modular jack;

whereby when said handset cover and said handset case are fastened together, the bottom of said modular jack abutting against said tapered surface of said fixing member to position said modular jack in a vertical direction.

* * * * *